United States Patent [19]

Weichhand

[11] Patent Number: 4,974,717

[45] Date of Patent: Dec. 4, 1990

[54] APPARATUS FOR TRANSFERRING ARTICLES

[75] Inventor: Robert J. Weichhand, Ft. Mitchell, Ky.

[73] Assignee: R. A. Jones & Co., Inc., Covington, Ky.

[21] Appl. No.: 442,451

[22] Filed: Nov. 28, 1989

Related U.S. Application Data

[63] Continuation of Ser. No. 244,328, Sep. 15, 1988, abandoned.

[51] Int. Cl.$^5$ .............................................. B65G 47/46
[52] U.S. Cl. .................................... 198/372; 198/370; 198/356; 198/481.1
[58] Field of Search ............... 198/370, 372, 358, 356, 198/357, 457, 481.1, 460, 419, 450, 369

[56] References Cited

U.S. PATENT DOCUMENTS

| | | | |
|---|---|---|---|
| 1,316,822 | 9/1919 | Yokich | 198/457 X |
| 1,701,765 | 2/1929 | Thompson | 198/481.1 |
| 1,959,123 | 5/1934 | Chapman | 198/481.1 |
| 2,335,588 | 11/1943 | Fox | 198/481.1 X |
| 3,031,062 | 4/1962 | Rabinow et al. | 198/481.1 |
| 3,133,638 | 5/1964 | Calhoun | 198/372 X |
| 3,148,783 | 9/1964 | Michaels | 198/370 X |
| 3,614,924 | 10/1971 | Hickey | 198/481.1 X |
| 3,955,678 | 5/1976 | Moyer | 198/370 X |
| 4,164,277 | 8/1979 | Fluck et al. | 198/369 |
| 4,261,456 | 4/1981 | Scarpa et al. | 198/481.1 X |
| 4,643,291 | 2/1987 | Counter et al. | 198/372 X |
| 4,760,910 | 8/1988 | Suzuki et al. | 198/457 X |

FOREIGN PATENT DOCUMENTS

| | | | |
|---|---|---|---|
| 2105947 | 10/1970 | Fed. Rep. of Germany | 198/481.1 |
| 0251169 | 8/1969 | U.S.S.R. | 198/481.1 |

Primary Examiner—H. Grant Skaggs
Assistant Examiner—James R. Bidwell
Attorney, Agent, or Firm—Wood, Herron & Evans

[57] ABSTRACT

Apparatus for transferring articles from one or more supply conveyors to one or more conveyors feeding cartoners. Articles are fed from the supply conveyors into a compartmented drum. The drum rotates and drops the articles onto the conveyors feeding the cartoners.

8 Claims, 4 Drawing Sheets

FIG. 1

APPARATUS FOR TRANSFERRING ARTICLES

This application is a continuation of application Ser. No. 07/244,328, filed Sept. 15, 1988, now abandoned.

This invention relates to article transfer apparatus, and particularly to apparatus for transferring "slugs" such as elongated packages of crackers that arrive from wrappers at a random spacing onto a conveyor that delivers the slugs to a cartoner. While the invention will be described in connection with the handling of elongated cracker packages, reference will be made, from time to time, to the handling of "slugs" which is intended to be a generic term embracing any elongated articles.

BACKGROUND OF THE INVENTION

Crackers are baked in an oven, wrapped into elongated packages, and fed, end-to-end, in random spacing toward a cartoner. It is necessary to change the orientation of the packages from movement in a longitudinal direction to movement in a transverse direction and to transfer the packages in a transverse direction into product buckets of a cartoner. One system achieving those requirements is described in Pat. No. 4,178,120, issued to the assignee of the present invention. In the apparatus of that patent, packages at the end of a wrapper discharge conveyor are thrust transversely off the conveyor into groups of about six packages. Of that group of packages, a transfer device picks off two packages in a longitudinal direction moving them onto a deadplate. From the deadplate, the two packages are swept transversely into product buckets. All of those transfers thus described require a lot of machinery and a lot of space. Further, when it is considered that each cracker oven probably has three wrapper conveyors feeding into a cartoner, the cost and space is obviously tripled.

While operating satisfactorily, the apparatus of Pat. No. 4,178,120 is slow. In an effort to improve the speed of the apparatus, the assignee of the present invention developed a transfer apparatus which is the subject matter of application Ser. No. 479,751, filed Mar. 28, 1983, now abandoned. That apparatus is similar to the apparatus of Pat. No. 2,744,608 in these respects: elongated packages are fed transversely in side-by-side abutting relation into a rotary star wheel or equivalent structure. The star wheel sweeps the packages from the infeed into product buckets passing below the star wheel. While this apparatus provides for the transfer of packages into the product buckets at a higher speed, there still remains the necessity of receiving randomly-spaced packages longitudinally-oriented from the wrapper discharge conveyor and transferring them in a controlled fashion in transverse orientation to the star wheel type mechanism for feeding the product buckets. Until the present invention, the current technology has been to provide a pocketed conveyor feeding into the star wheel type transfer apparatus and to provide mechanism for sweeping longitudinally-oriented packages transversely off the wrapper discharge conveyor transversely onto the pocketed conveyor. While this apparatus has been generally satisfactory, under certain conditions there has been the need for the present invention. The problem has been, largely, that there is a loss of control of the packages as they are transferred onto the pocketed conveyor so that the packages are not oriented precisely at right angles to the direction of movement of the pocketed conveyor. Some packages may be piled on top of one another and the packages may be transversely misaligned so that they cannot be fed properly into the star wheel type transfer apparatus.

It has been an objective of the present invention to provide a right angle transfer for randomly-arriving elongated, longitudinally-oriented slugs, the transfer depositing the slugs on a conveyor such that the slugs do not touch one another. Thus, the transferred slugs do not accumulate and do not crowd and apply downstream pressure to slugs being fed to a cartoner.

It has been another objective of the present invention to provide a transfer in which the slugs, once moved into the transfer mechanism, remain under control.

It has been another objective of the present invention to provide a right angle transfer wherein the articles are deposited onto a pocketed conveyor, having one pocket per article. When the articles are deposited on the conveyor, they are transversely aligned so that they can be received by the mechanism for transferring the slugs into a cartoner without substantial additional transverse alignment and thus do not introduce any problems in the operation of the product bucket transfer mechanism.

It has been another objective of the present invention to provide a pass-through feature wherein the transfer mechanism of the present invention can accept or reject a slug.

It is still another objective of the present invention to provide a system of plural cartoners and/or storage operating in conjunction with the right angle transfer of the present invention with its pass-through feature. The satisfying of this objective of the invention provides for a redundancy and flexibility that is particularly useful in the manufacture and cartoning of crackers as well as other similar applications. In the packaging of crackers, the crackers are formed and baked in ovens. The crackers are wrapped in elongated packages and fed on wrapper conveyors to the cartoner. If a cartoner must stop for whatever reason, the flow of cracker packages must continue, since many minutes would be required to shut down the oven in which the crackers are formed. By providing two cartoners alongside each other, considerable flexibility if provided. For example, the cartoners can be fed equally until one is shut down temporarily, whereupon the other cartoner would handle the entire output from the oven. Alternatively, one cartoner can handle the entire output while the other cartoner is running at an idle speed ready to take over in the event that the first cartoner is down. It is possible to bypass all cartoners and run the product into storage. It is possible to run a cartoner having two packages to a carton on one system while simultaneously running four packages to a carton on the adjacent system. It is possible to take down one cartoner for maintenance while the other cartoner continues to operate. It is possible to eliminate entirely the need for a storage system and return that currently is required to accommodate the flow of cracker packages when a single cartoner system is down.

The objectives of the present invention are attained by the combination of a rotating drum positioned alongside the wrapper discharge conveyor. The rotary drum has a series of compartments spaced around its periphery. A rotating paddle wheel is provided for moving longitudinally-oriented packages from the wrapper discharge conveyor into compartments in the periphery of the drum. Below the drum is a pocketed conveyor. The conveyor has one pocket for each package. If one drum feeds the pocketed conveyor, one pocket passes under the drum for each compartment on the drum that rotates past the conveyor. If there are two or three drums feeding the conveyor, then there are two or three pockets on the conveyor for each compartment on one of the drums. Thus, the number of pockets on the conveyor passing the drum(s) equals the number of compartment on the drum or drums feeding the conveyor.

Further, the drums have axial guides that engage the ends of the packages so as to position the packages onto the pocketed conveyor in a fairly precise transverse orientation.

The right angle transfer of the present invention "squares" the package on the pocketed conveyor, that is, the axis of the package is perpendicular to the direction of travel of the pocketed conveyor. The package is under control from the moment that it leaves the wrapper discharge conveyor, thereby eliminating cockeyed orientation of the packages or any piling of packages on top of one another.

The packages on the pocketed conveyor are slightly spaced from one another, thereby avoiding any piling up of packages with the attendant pressure that tends to cause the packages to pop up and deorient before being transferred into the product buckets.

The several features and objectives of the present invention will become more readily apparent from the following detailed description taken in conjunction with the accompanying drawings in which:

FIG. 1 is a detailed perspective view of the transfer mechanism;

Figure 1:
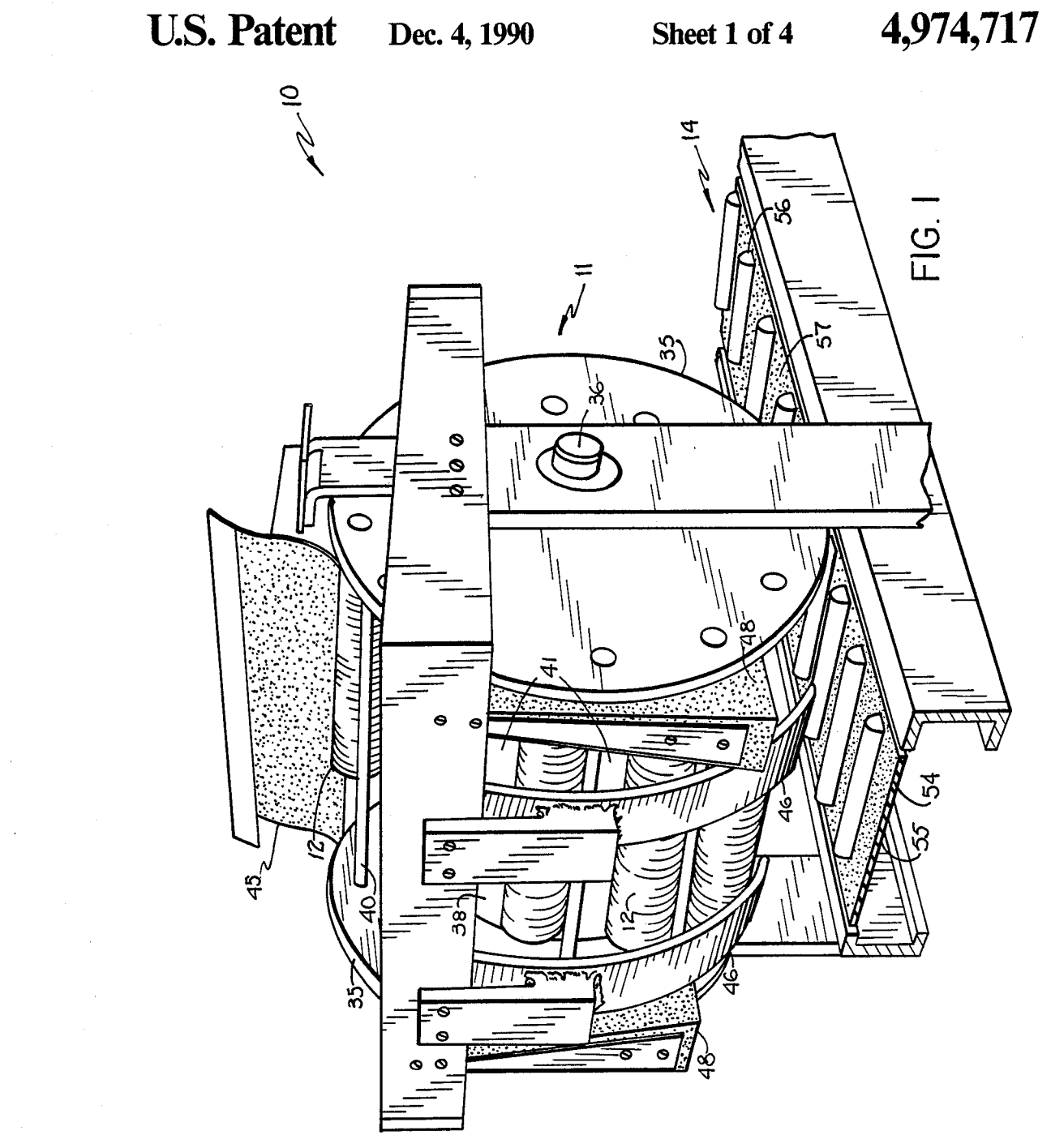
Figure 2:
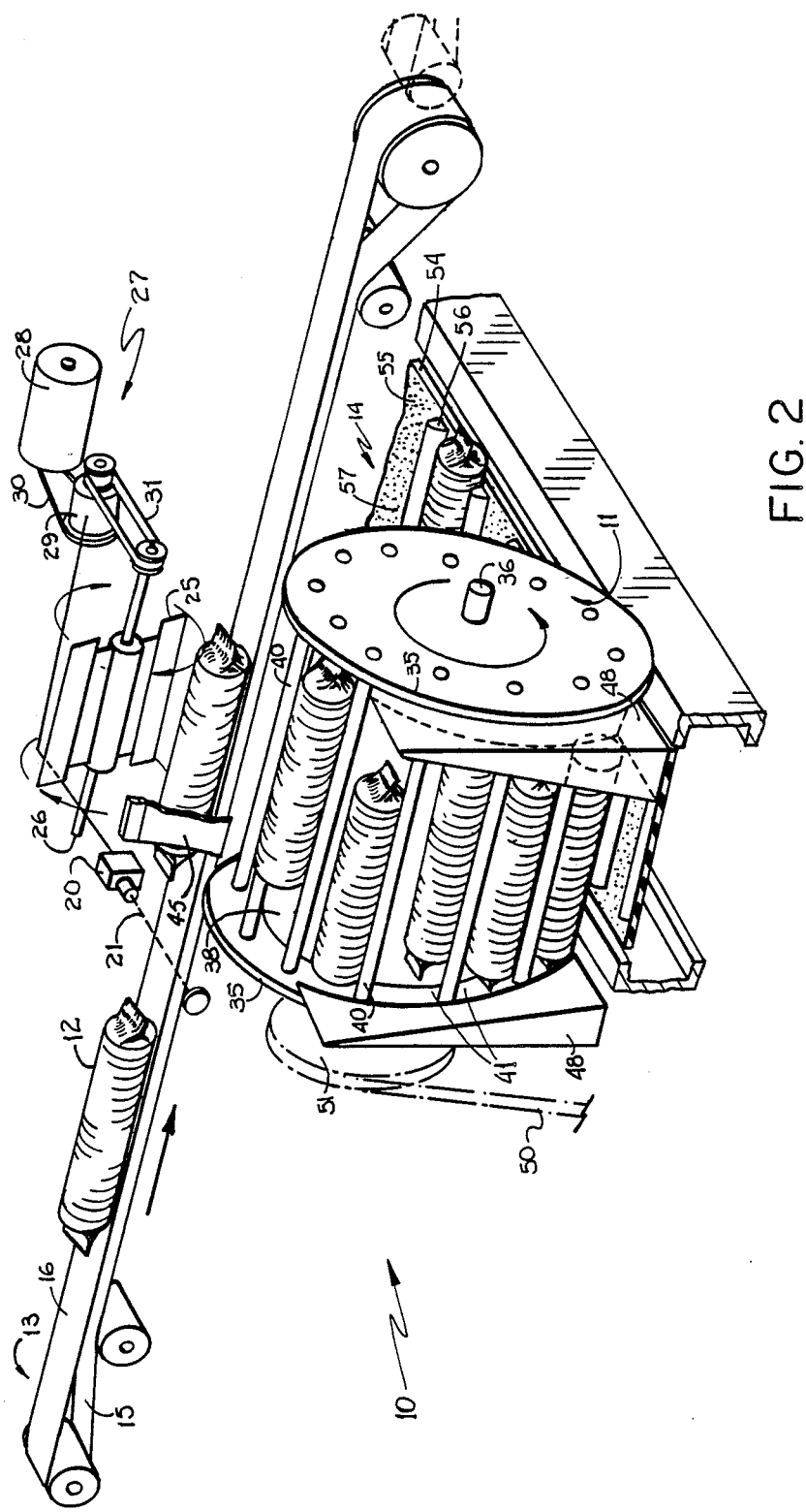
FIG. 2 is a diagrammatic perspective view of the transfer mechanism.

Referring to FIGS. 1 and 2, a transfer mechanism is shown at 10. A principal element of the transfer mechanism is a drum 11 that transfers slugs such as cracker packages 12 from an upstream or wrapper discharge conveyor 13 to a downstream or pocketed infeed conveyor 14. The upstream wrapper discharge conveyor is an endless belt 15 having an upper run 16. A photoelectric detection device 20 is disposed alongside the upper run 16 of the conveyor 13 and immediately upstream of the drum 11. It has a beam 21 which is interrupted when an article 12 passes through it.

A displacement paddle 25 is rotatably mounted on a shaft 26 alongside the conveyor 13 and in a position to engage articles 12 and transfer them onto the drum 11. A drive for the displacement paddle 25 is indicated at 27. It includes a motor 28, a clutch 29, a belt or chain 30 connecting the motor to the input side of the clutch and a belt or chain 31 connecting the output side of the clutch to the drum.

The detection device 20 is connected to the clutch 29 to energize it causing the paddle 25 to rotate through 180° as each article moves into position to be transferred to the drum 11. While one drive mechanism for the displacement paddle has been illustrated and described, it should be understood that other systems for effecting the sliding of the article off the conveyor 13 and onto the drum are within the scope of the invention. In some situations, a plow may be used to slide the article off the conveyor onto the drum.

The drum 11 has a pair of spaced parallel plates 35 that are mounted on a shaft 36 that is parallel to the shaft 26 of the paddle. A cylindrical tube 38, for example 10 inches in diameter, is mounted between the plates 35. A plurality of bars 40 are uniformly spaced around the periphery of the drum and connected between the plates 35. The bars 40 are positioned radially outwardly from the tube 38 and form, with the tube 38, in squirrel cage fashion, a plurality of compartments 41 spaced uniformly around the drum 11. In the illustrated embodiment, twelve compartments are shown.

A flexible deflector 45 is mounted above the drum and in the path of the articles that are slid from the conveyor 13 onto the drum. The flexible deflector simply assures that the articles will move from the conveyor 13 into a compartment 41 at the time of transfer.

As shown in FIG. 1, a pair of guides 46 surround a portion of the drum to provide assurance that the articles are confined to the drum.

A pair of centering guides 48 also overlie the drum to provide assurance that articles that are dropped onto the drum axially off-center are transversely centered during their excursion from the conveyor 13 to the pocketed conveyor 14.

The drive for the drum 11 is directly connected to the conveyor 14 by means of a chain 50 driven by the conveyor 14 and passing around a sprocket 51 on the shaft 36. Thus, the shaft 36 is connected to be driven directly by the conveyor 14.

The pocketed conveyor 14 consists of an endless chain or belt 54 to form a support surface 55. The support surface carries lugs 56 that are uniformly spaced along the conveyor 14, each pair of lugs 56 forming a pocket 57 between them. Each pocket 57 is of a width to receive one article or package of crackers 12.

The drum 11 runs slightly faster than the flow of packages coming in from the wrapper discharge conveyor, that is, the drum 11 will rotate to bring past the conveyor 13 slightly more compartments than there are packages to be delivered from the conveyor 13. Thus, there is assurance that there will always be an empty compartment for a package as it is slid off the conveyor 13.

The pocket speed of the conveyor 14 is matched to the compartment speed of the drum 11. If there is but one drum feeding the pocket conveyor 14, then the compartment-to-pocket ratio will be one-to-one, that is, one compartment will rotate past the pocket conveyor for every pocket that passes underneath the drum. If there are two transfer drums feeding a single pocketed conveyor, the ratio will be two pockets for each drum compartment. If there are three drums feeding the single pocketed conveyor, then three pockets for each drum compartment so that each drum can put packages into no more than every third pocket.

The packages are completely under control when they leave conveyor 13 until they are delivered to the cartoner. When confined to the drum 11, they are under control. When deposited in their pockets 57, they are under control and square or perpendicular to the direction of movement of conveyor 14.

Figure 3:
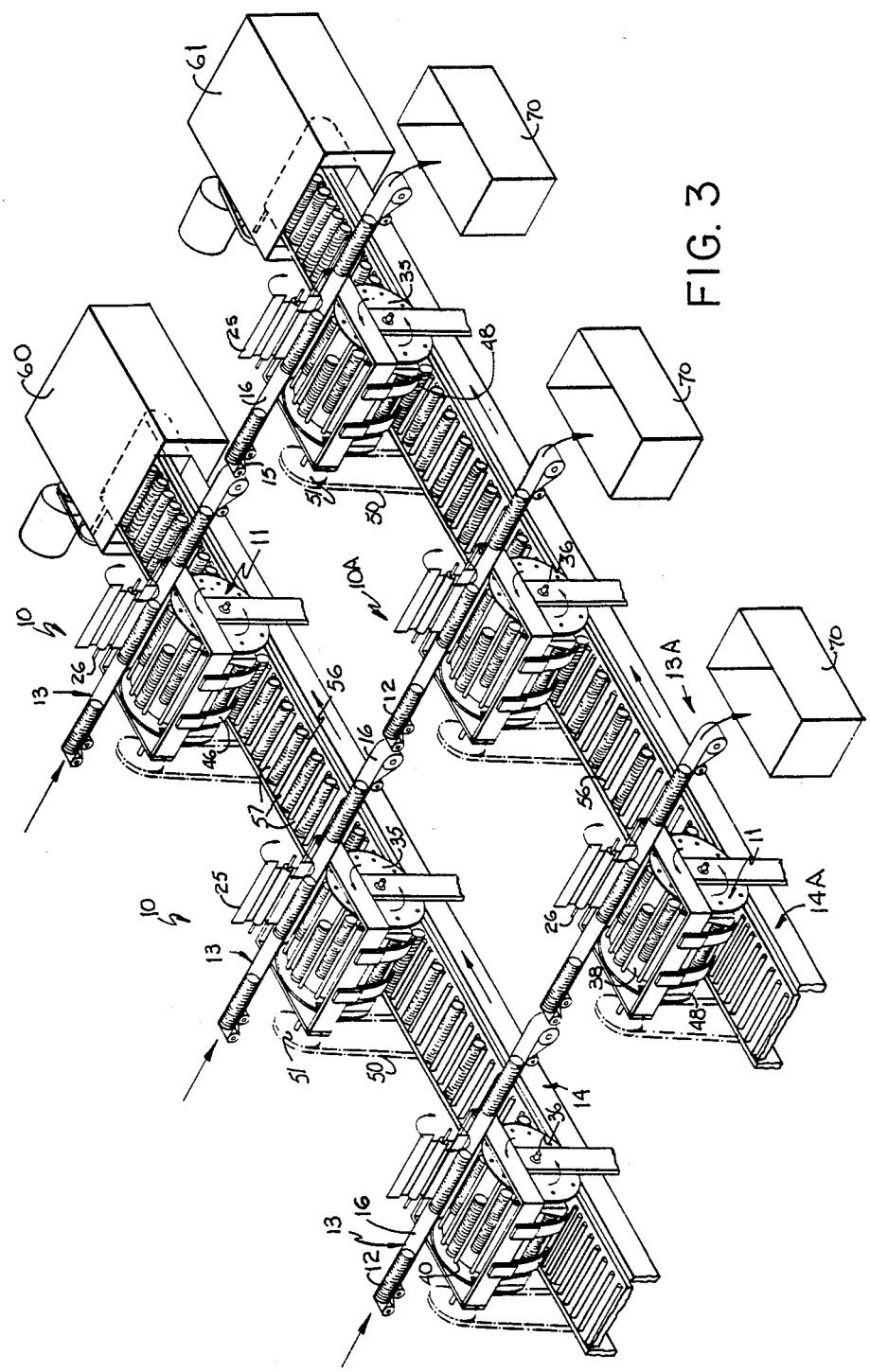
FIG. 3 is a diagrammatic perspective view of an overall system of multiple cartoners and multiple feed lines, the system being shown with the cartoners in operation.

The transfer mechanism 10 is part of a larger system such as is illustrated in FIG. 3. There, three wrapper discharge conveyors 13 are disposed parallel to each other. The wrapper discharge conveyors are associated with wrapping machines (not shown) and the wrapping machines are connected to an oven (not shown) in which the crackers are formed and baked.

Two cartoners diagrammatically shown at 60 and 61 are connected to pocketed conveyors 14 and 14A. The wrapper discharge conveyors 13 overlie the downstream pocketed conveyor 14 and are generally at right angles to it. A transfer mechanism 10 is associated with each intersection of conveyor 13 with conveyor 14.

The conveyor 14A is associated with a second set of upstream conveyors 13A and with a second or "back-up" set of transfer mechanisms 10A located at the intersections of the upstream conveyors 13A with the downstream conveyor 14A.

In this form of the invention either one of the cartoners 60 or 61 could be normally in operation with the other being at ready. Assume for the sake of the description that 60 is operative and 61 is at standby. Packages of crackers 12 are being fed on each conveyor 13 at the rate of about 150 per minute. The speed relationship of the transfer drum 11 to the pocketed conveyor 14 is one compartment 41 to three pockets 57 so that packages 12 from the drum 11 are deposited in every third pocket 57. The upstream transfer mechanism therefore fills every third pocket 57. The center transfer mechanism fills every adjacent pocket and the downstream transfer mechanism 10 fills the remaining third pocket so that all pockets are full feeding into the cartoner 60. There are spaces between each package. The system is such that no more than the preselected number of packages per unit of length of the conveyor 14 can be deposited. For example, in the preferred form, every foot of conveyor 14 will have three and no more than three packages. There may be less than three if a compartment 41 on one of the transfer drums is not filled but that is of no consequence. Thus, the cartoner 60 receives 450 packages per minute which is a comfortable rate at which that cartoner operates.

If cartoner 60 goes down for fault correction, a control system immediately shifts delivery to cartoner 61 and disables the transfer mechanisms 10. The transfer mechanisms 10A are operated. Under these circumstances, packages on the conveyors 13 will simply pass through the transfer mechanisms 10 and move onto the upstream conveyors 13A. The transfer mechanisms 10A will transfer the packages onto the downstream conveyor 14A until the fault on conveyor 60 is corrected.

When the fault on the cartoner 60 is corrected, the cartoner 61 can continue to run until it must be stopped for fault correction. At that time, the upstream transfer mechanisms 10 are energized and the cartoner 60 is operated to take over the cartoner function. In the event that both cartoners are down simultaneously, the packages will pass through to the storage bins 70.

An alternate way of operating the system would be to deliver half the packages to cartoner 60 and half to cartoner 61. To do that, the electric eye that operates the transferring paddles 25 would be set to transfer every other package that comes to the transfer mechanism. In this way, one package would go to cartoner 60 and the next would go to cartoner 61, etc. Both cartoners would run at approximately half speed. In the event of a fault on either cartoner, the other would run at full speed with the transfer mechanisms being programmed to deliver all packages to the full speed cartoner. Other variations in the system, for example, using more than two cartoners and more than two conveyors 14 that deliver packages to the cartoner, will be apparent.

While two modes of operation utilizing the invention have been described, it should be understood that variations in those modes are feasible and even preferable in some instances. For example, assume three cartoner lines being fed by three wrappers. The conveyors 14 could be continuously run at a speed great enough to handle product from all three wrappers, i.e., three times the speed necessary to handle its wrapper line. If one cartoner stops, product is instantly shifted to one of the other lines. No speed change of conveyor 14 is required. It simply accepts the product and runs at $\frac{2}{3}$ capacity rather than $\frac{1}{3}$. Similarly, if two cartoners are stopped, one conveyor and cartoner, operating at full capacity, handle all of the product from the three wrappers.

Figure 4:
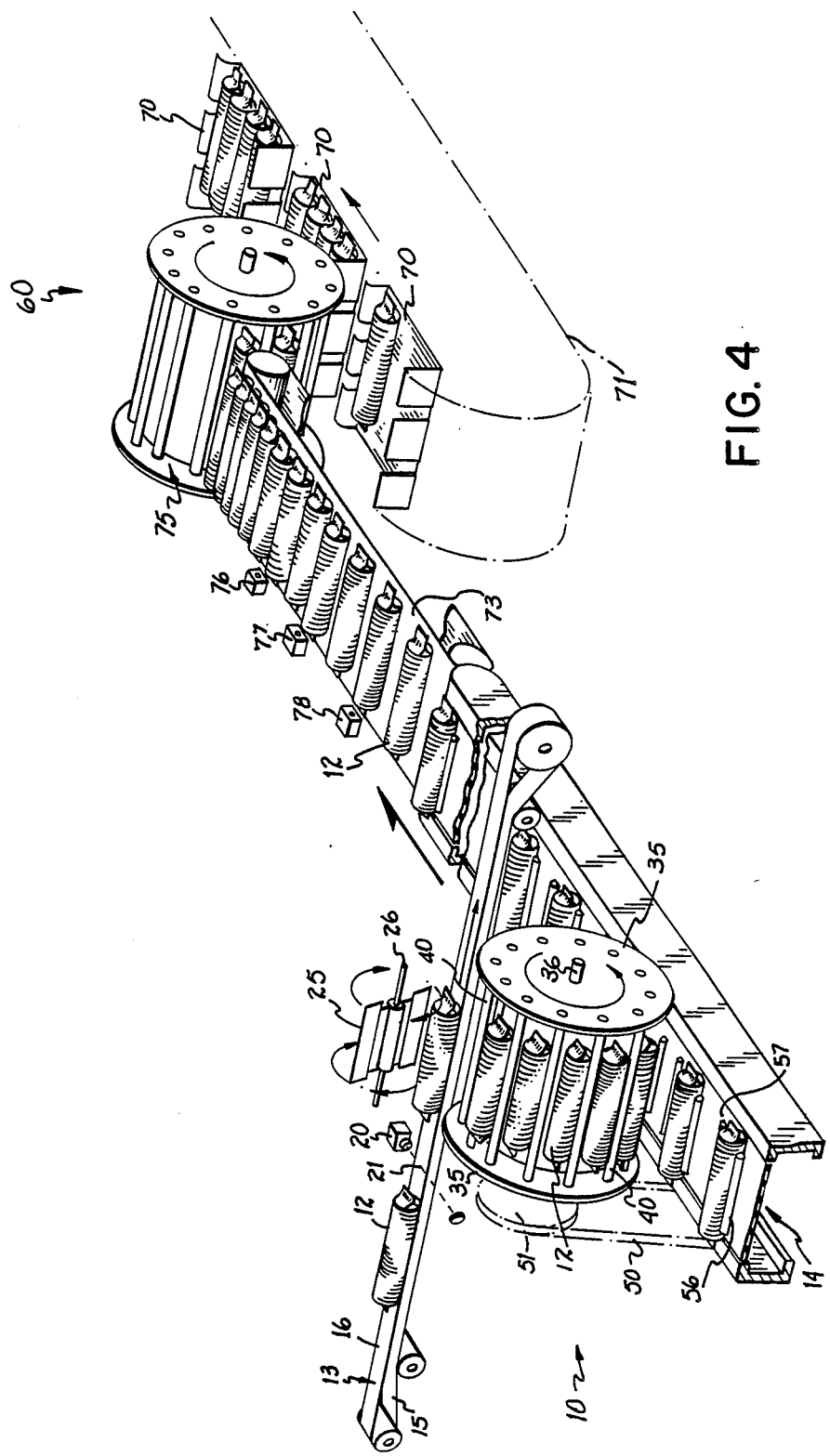
FIG. 4 is a diagrammatic perspective view of assignee's right angle transfer of the present invention combined with a product bucket transfer.

FIG. 4 is a diagrammatic illustration of the feed of the pocket conveyor utilizing the present invention into a bucket transfer.

Product buckets 70 are mounted on an endless conveyor 71. An infeed belt conveyor 73 receives all packages from the pocket conveyor 14. A star wheel type transfer wheel 75 receives the packages from the infeed belt conveyor and deposits them into the product buckets 70 as shown.

The packages on the infeed belt conveyor are in side-by-side abutment. A series of electric eyes 76, 77 and 78 monitor how many packages are stacked up on the conveyor 73. Those electric eyes control the rate of operation of the cartoner to take away packages more rapidly when the number stacked up grows higher. Electric eyes modulate the speed of the cartons in accordance with the rate of the incoming slugs.

From the above disclosure of the general principles of the present invention and the preceding detailed description of a preferred embodiment, those skilled in the art will readily comprehend the various modifications to which the present invention is susceptible. For example, instead of the cylindrical drum, endless chains with storage bars to receive the elongated packages could be employed as a transfer mechanism. Therefore, I desire to be limited only by the scope of the following claims and equivalents thereof:

I claim:

1. Transfer apparatus for elongated slugs delivered in random spacing comprising, an upstream conveyor for conveying longitudinally-oriented slugs, means for driving said upstream conveyor, a rotary transfer mechanism adjacent the upstream conveyor, said transfer mechanism having a plurality of slug-receiving compartments positioned immediately adjacent to one another around the perimeter of said mechanism, means for moving each slug from said upstream conveyor into a compartment of said transfer mechanism, said means for moving slugs onto said transfer mechanism comprising a displacement paddle rotatably-mounted adjacent said upstream conveyor and in position to engage the side of a slug on said upstream conveyor and transfer it onto said transfer mechanism, means for detecting a slug on said upstream conveyor approaching said paddle, means for rotating said paddle after detection of a slug, means for rotating said transfer mechanism at a speed great enough to bring more compartments past said upstream conveyor than there are slugs conveyed to said compartments by said upstream conveyor, a downstream conveyor passing under said transfer mechanism, means for driving said downstream conveyor, said downstream conveyor having a plurality of longitudinally-spaced pockets on its upper surface, the speed of said downstream conveyor bringing a conveyor pocket past said mechanism for each mechanism compartment that moves past said downstream conveyor, said slugs dropping from said transfer mechanism onto said downstream conveyor, whereby, regardless of the spacing and timing of slugs delivered to said transfer mechanism, said transfer mechanism will receive said slugs and deliver them in timed relation to the pockets of said downstream conveyor.

2. Apparatus as in claim 1, said upstream conveyor and paddle conveying slugs to said transfer mechanism at a rate no greater than that required to fill each compartment in said mechanism.

3. Apparatus for transferring packages of processed, wrapped foodstuffs such as crackers from at least two wrapper lines to at least two cartoners comprising, two laterally-spaced, parallel, downstream conveyors for said cartoners, two laterally-spaced, parallel wrapper discharge conveyors passing over both said downstream conveyors and being generally perpendicular to said downstream conveyors, a transfer mechanism at each location where an upstream conveyor overlies a downstream conveyor for transferring said packages from said upstream conveyor to said downstream conveyor, each said transfer mechanism comprising:

a drum overlying said downstream conveyor and adjacent said upstream conveyor, said drum having an axis parallel to said upstream conveyor and having a plurality of compartments spaced around its periphery, means for detecting the presence of a package to be transferred, means responsive to said detecting means for transferring a package from said upstream conveyor to said drum, and means for rotating said drum to transfer packages received from said upstream conveyor to said downstream conveyor, and means for selectively operating and disabling said transfer mechanisms to transfer packages to a downstream conveyor or pass said packages past said downstream conveyor, whereby one of said cartoners receives all packages being conveyed on said two upstream conveyors while the other cartoner is down.

4. Apparatus as in claim 3 in which selected transferring mechanisms can be disabled for temporarily bypassing one cartoner and diverting all articles to another of said cartoners.

5. Transfer apparatus for elongated slugs comprising, an upstream conveyor, means for driving said upstream conveyor, a rotary transfer mechanism adjacent the upstream conveyor, means for rotating said transfer mechanism, means for moving slugs from said upstream conveyor to said transfer mechanism, a downstream conveyor passing under said transfer mechanism, means for driving said downstream conveyor, said slugs dropping from said transfer mechanism onto said downstream conveyor, said moving means comprising a paddle mounted on an axis parallel to the axis of said transfer mechanism, said paddle being adjacent said upstream conveyor and said mechanism, a continuous drive for said paddle, a clutch between said continuous drive and said paddle, and means, responsive to the passage of a slug on said upstream conveyor, for operating said clutch to rotate said paddle.

6. Apparatus for transferring packages of processed, wrapped foodstuffs such as crackers from at least two wrapper lines to at least two cartoners comprising, two laterally-spaced, parallel, downstream conveyors for said cartoners, two laterally-spaced, parallel wrapper discharge conveyors passing over both said downstream conveyors and being generally perpendicular to said downstream conveyors, a transfer mechanism at each location where an upstream conveyor overlies a downstream conveyor for transferring said packages from said upstream conveyor to said downstream conveyor, each said transfer mechanism comprising:

a drum overlying said downstream conveyor and adjacent said upstream conveyor, said drum having an axis parallel to said upstream conveyor and having a plurality of compartments positioned immediately adjacent one another around the perimeter of said drum, said drum receiving packages randomly delivered to it at a rate slightly less than the number of compartments moving past said upstream conveyor, and means for selectively operating and disabling said transfer mechanisms to transfer packages to a downstream conveyor or pass said packages past said downstream conveyor, whereby one of said cartoners receives all packages being conveyed on said two upstream conveyors while the other cartoner is down.

7. Apparatus for transferring identical articles from at least two primary sources to at least two cartoners comprising, at least two laterally-spaced, parallel, downstream conveyors for said cartoners, at least two laterally-spaced, parallel primary source upstream conveyors passing over both said downstream conveyors and being generally perpendicular to said downstream conveyors, a transfer mechanism at each location where an upstream conveyor overlies a downstream conveyor for transferring said articles from all upstream conveyors to one of said downstream conveyors, said downstream conveyor having a series of uniformly-spaced article-receiving positions, each position adapted to receive one article transferred to it from said upstream conveyor, means operating each said transfer mechanism at a speed that will deliver x articles per minute to said downstream conveyor, means operating said downstream conveyor at a speed, timed to said transfer mechanism to cause n×positions per minute to pass under said transfer mechanism where n is the number of upstream conveyors, thereby assuring deposit of only one article at each position, and means independent of said articles for selectively operating and disabling said transfer mechanisms to transfer articles to all downstream conveyors or selectively pass said articles past one said downstream conveyor and combine said articles in the remaining downstream conveyors, whereby the apparatus has the flexibility to permit simultaneous delivery of articles from all primary sources to all said downstream conveyors in varying percentages, or, alternatively, to deliver all articles from said primary sources to less than all downstream conveyors, which then operate at a greater rate of articles per minute handled.

8. Apparatus for transferring identical elongated articles from at least one primary source to at least two cartoners comprising, at least two laterally-spaced, parallel, downstream conveyors for said cartoners, at least two laterally-spaced, parallel primary source upstream conveyors passing over said downstream conveyors and being generally perpendicular to said downstream conveyors, a transfer mechanism at each location where an upstream conveyor overlies a downstream conveyor for transferring said articles from said upstream conveyor to said downstream conveyor, each downstream conveyor having a plurality of uniformly-spaced pockets each for receiving one article from a transfer mechanism, each transfer mechanism including a rotary drum having a plurality of circumferentially-spaced compartments, each said rotary drum being connected to its downstream conveyor, the ratio of number of pockets passing under a transfer mechanism to the number of drum compartments of a transfer mechanism passing the downstream conveyor is equal to the number of transfer mechanisms overlying the downstream conveyor so that there is a pocket for every article transferred to said downstream conveyor by said transfer mechanism.

* * * * *